(12) United States Patent
Wan et al.

(10) Patent No.: US 11,029,010 B2
(45) Date of Patent: Jun. 8, 2021

(54) SENSOR LIGHT AND A SYSTEM FOR PREVENTING FALSE TRIGGERING OF A SENSOR

(71) Applicant: ZHEJIANG SHENGHUI LIGHTING CO., LTD., Jiaxing (CN)

(72) Inventors: Yehua Wan, Jiaxing (CN); Xuchu Ge, Jiaxing (CN); Jinxiang Shen, Jiaxing (CN)

(73) Assignee: ZHEJIANG SHENGHUI LIGHTING CO., LTD., Jiaxing (CN)

( * ) Notice: Subject to any disclaimer, the term of this patent is extended or adjusted under 35 U.S.C. 154(b) by 5 days.

(21) Appl. No.: 16/466,136

(22) PCT Filed: Jul. 6, 2017

(86) PCT No.: PCT/CN2017/091938
§ 371 (c)(1),
(2) Date: Jun. 3, 2019

(87) PCT Pub. No.: WO2018/113255
PCT Pub. Date: Jun. 28, 2018

(65) Prior Publication Data
US 2020/0072452 A1  Mar. 5, 2020

(30) Foreign Application Priority Data

Dec. 23, 2016  (CN) .......................... 201611206980.6

(51) Int. Cl.
*F21V 23/04* (2006.01)
*F21V 5/04* (2006.01)
(Continued)

(52) U.S. Cl.
CPC ............ *F21V 23/0442* (2013.01); *F21K 9/60* (2016.08); *F21V 5/045* (2013.01); *H05B 47/105* (2020.01)

(58) Field of Classification Search
CPC ...... F21V 23/0442; F21V 29/15; F21V 5/045; H05B 47/105; H05B 47/13; G08B 13/19;
(Continued)

(56) References Cited

U.S. PATENT DOCUMENTS

2014/0140067 A1*  5/2014  Chen ....................... F21K 9/232
362/294

FOREIGN PATENT DOCUMENTS

CN     2366688 Y     3/2000
CN   201396633 Y     2/2010
(Continued)

OTHER PUBLICATIONS

The World Intellectual Property Organization (WIPO) International Search Report and Written Opinion for PCT/CN2017/091938 dated Oct. 11, 2017, 9 Pages.

*Primary Examiner* — Joseph L Williams
*Assistant Examiner* — Jacob R Stern
(74) *Attorney, Agent, or Firm* — Anova Law Group, PLLC (57) ABSTRACT

The present disclosure provides a sensor light and a system for preventing false triggering of a sensor. The sensor light includes a sensor module, a light emitting module, a power drive circuit, and a shielding component. The sensor module is configured to measure incoming infrared light radiated to the sensor module, and generate a trigger signal when the measured infrared light meets a preset condition. The light emitting module is configured to emit light. The power drive circuit is connected to the sensor module and the light emitting module, and configured to receive the trigger signal from the sensor module, and control the light emitting module to emit light in response to the trigger signal. The shielding component is disposed between the sensor module and the light emitting module, and configured to shield the sensor module from radiation of infrared light generated by the light emitting module.

13 Claims, 7 Drawing Sheets

(51) Int. Cl.
*F21K 9/60* (2016.01)
*H05B 47/105* (2020.01)

(58) Field of Classification Search
CPC ... G08B 13/193; G08B 13/191; G01J 1/0271;
G01J 1/4204; F21K 9/60
See application file for complete search history.

(56) References Cited

FOREIGN PATENT DOCUMENTS

| | | |
|---|---|---|
| CN | 202140838 U | 2/2012 |
| CN | 202144953 U | 2/2012 |
| CN | 106594538 A | 4/2017 |
| EP | 2280586 A2 | 2/2011 |
| EP | 2713102 A1 | 4/2014 |
| JP | 2007265836 A | 10/2007 |
| JP | 2011175786 A | 9/2011 |
| WO | 2013183987 A1 | 12/2013 |
| WO | 2016112743 A1 | 7/2016 |

* cited by examiner

SENSOR LIGHT AND A SYSTEM FOR PREVENTING FALSE TRIGGERING OF A SENSOR

CROSS-REFERENCES TO RELATED APPLICATIONS

This application is a national phase entry under 35 U.S.C. § 371 of PCT Patent Application No. PCT/CN2017/091938, filed on Jul. 6, 2017, which claims the priority of Chinese Patent Application No. 201611206980.6, entitled "A SENSOR LIGHT AND A SYSTEM FOR PREVENTING FALSE TRIGGERING OF A SENSOR," filed on Dec. 23, 2016, the entire contents of which is incorporated herein by reference.

FIELD OF THE DISCLOSURE

The present disclosure relates to the field of lighting technologies and, more particularly, relates to a sensor light and a system for preventing false triggering of a sensor.

BACKGROUND

Human body sensor light or sensor module light is a technological product designed and developed based on infrared and pyroelectric principles for detecting and sensing human activities. In existing LED sensor lights, because an LED illumination module can dissipate heat and can remain at a relative high temperature after stopping emitting light, the LED illumination module may also generate infrared rays. Such infrared rays may be detected by an embedded passive infrared (PIR) sensor of the sensor light and falsely trigger the sensor light to be turned on.

The disclosed method and system are directed to solve one or more problems set forth above and other problems.

BRIEF SUMMARY OF THE DISCLOSURE

One aspect of the present disclosure provides a sensor light, including a sensor module, a light emitting module, a power drive circuit, and a shielding component. The sensor module is configured to measure incoming infrared light radiated to the sensor module, and generate a trigger signal when the measured infrared light meets a preset condition. The light emitting module is configured to emit light. The power drive circuit is connected to the sensor module and the light emitting module, and is configured to receive the trigger signal from the sensor module, and control the light emitting module to emit light in response to the trigger signal received from the sensor module. The shielding component is disposed between the sensor module and the light emitting module, and configured to shield the sensor module from radiation of infrared light generated by the light emitting module.

By introducing the shielding component to the sensor light, false triggering of the sensor module, especially a false triggering caused by heat dissipation from the light emitting module, can be prevented.

Optionally, the shielding component originates at a same or lower horizontal level than the sensor module, and surrounds a side of the sensor module. A highest horizontal level of the shielding component is greater than a highest horizontal level of the light emitting module. A horizontal level refers to a level of a plane perpendicular to an axis direction of the sensor light.

Optionally, the highest horizontal level of the shielding component is greater than a highest horizontal level of the sensor module.

Optionally, the sensor light further includes a Fresnel lens configured to cover the sensor module and concentrate the incoming infrared light for the sensor module, wherein the light emitting module is located outside the Fresnel lens.

Optionally, the highest horizontal level of the shielding component is no greater than a highest horizontal level of the Fresnel lens.

Optionally, the shielding component is covered by the Fresnel lens.

Optionally, the shielding component surrounds an outside of the Fresnel lens.

Optionally, the shielding component includes a first layer and a second layer; the first layer of the shielding component is covered by the Fresnel lens; and the second layer of the shielding component surrounds a side of the Fresnel lens.

Optionally, the shielding component has a single layer structure or includes multiple layers.

Optionally, the shielding component includes a vertical wall or a slanted wall.

Optionally, a top end of the shielding component is open; and a cross section of the shielding component has a circular shape, an eclipse shape, or a rectangular shape.

Optionally, the sensor module is disposed on a center of a substrate of the light emitting module; the light emitting module includes a plurality of LED light emitters scattered around the center of the substrate of the light emitting module; and a lens holder is disposed on a substrate of the sensor module for mounting the Fresnel lens.

Optionally, a material of the shielding component is non-polyolefin.

Optionally, a thickness of the shielding component and a distance between the shielding component and the light emitting module is determined based on a lighting intensity of the light emitting module.

Optionally, a height of the shielding component is determined based on a lighting intensity of the light emitting module, the highest horizontal level of the light emitting module, a location of the sensor module, and the highest horizontal level of the sensor module.

Optionally, a slanted degree of the shielding component corresponds to a lighting intensity of the light emitting module, a location of the sensor module, and the highest horizontal level of the sensor module.

Optionally, the sensor light further includes: a housing including an opening top part and a bottom part, a lamp holder for connecting to the bottom part of the housing, a reflector, and an optical lens structure. Further, the sensor module, the light emitting module, and the power drive circuit are installed in the housing through the opening top part. The reflector and the optical lens structure are sequentially disposed at the opening top part. The optical lens structure has a compatible shape for covering the opening top part of the housing.

Optionally, an inner edge of the top opening part includes a first mounting structure and a second mounting structure, the first mounting structure being closer to a top end of the housing than the second mounting structure; the optical lens structure is mounted on the first mounting structure by a first fastening piece; and the light emitting module is mounted on the second mounting structure by a second fastening piece.

Another aspect of the present disclosure provides a system for preventing false triggering of a sensor. The system includes a sensor module and a shielding component. The sensor module is configured to measure incoming infrared light radiated to the sensor module, and generate a trigger signal when the measured infrared light satisfies a preset condition; and the shielding component is located between the sensor module and a heat dissipation source, and configured to shield the sensor module from radiation of infrared light generated by the heat dissipation source.

Optionally, the shielding component originates at a same or lower horizontal level than the sensor module, and surrounds a side of the sensor module; and the highest horizontal level of the shielding component is greater than a highest horizontal level of the heat dissipation source.

Optionally, the system further includes a Fresnel lens configured to cover the sensor module and concentrate the incoming infrared light for the sensor module. Further, the highest horizontal level of the shielding component is no greater than a highest horizontal level of the Fresnel lens.

Optionally, the shielding component includes at least one of: a first layer covered by the Fresnel lens, or a second layer surrounding a side of the Fresnel lens.

Other aspects of the present disclosure can be understood by those skilled in the art in light of the description, the claims, and the drawings of the present disclosure.

By implementing the disclosed sensor light or the disclosed system, the shielding component can reduce or prevent infrared radiation from a heat dissipation source to the sensor module, thereby preventing false triggering of the sensor, especially a false triggering caused by heat dissipation from the light emitting module.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a sensor light (e.g., LED illumination lamp) including a sensor module. When a person or an object with warm temperature enters a sensing range of the sensor module, the sensor module may output a high-level pulse signal, or a high-level delay signal. The outputted pulse signal or delay signal can directly drive the sensor light (e.g., by triggering a power drive circuit to control a light emitting module to emit light). The sensor light can be automatically turned on when a person is in the proximity of the light, and can be automatically turned off at a delayed time. The sensor light can prevent man-made energy waste, extend the life of electrical appliances, and provide convenient security capabilities.

In an exemplary embodiment, a working principle of the disclosed sensor light includes that: infrared rays from a human body or other objects is detected by a sensor module including a passive infrared (PIR) sensor. The sensor module accordingly provides a trigger signal to a driver circuit for lighting an illumination module (e.g., LED light emitter). Further, the infrared rays may be refracted by a Fresnel lens before being incident on the PIR sensor.

Figure 1:
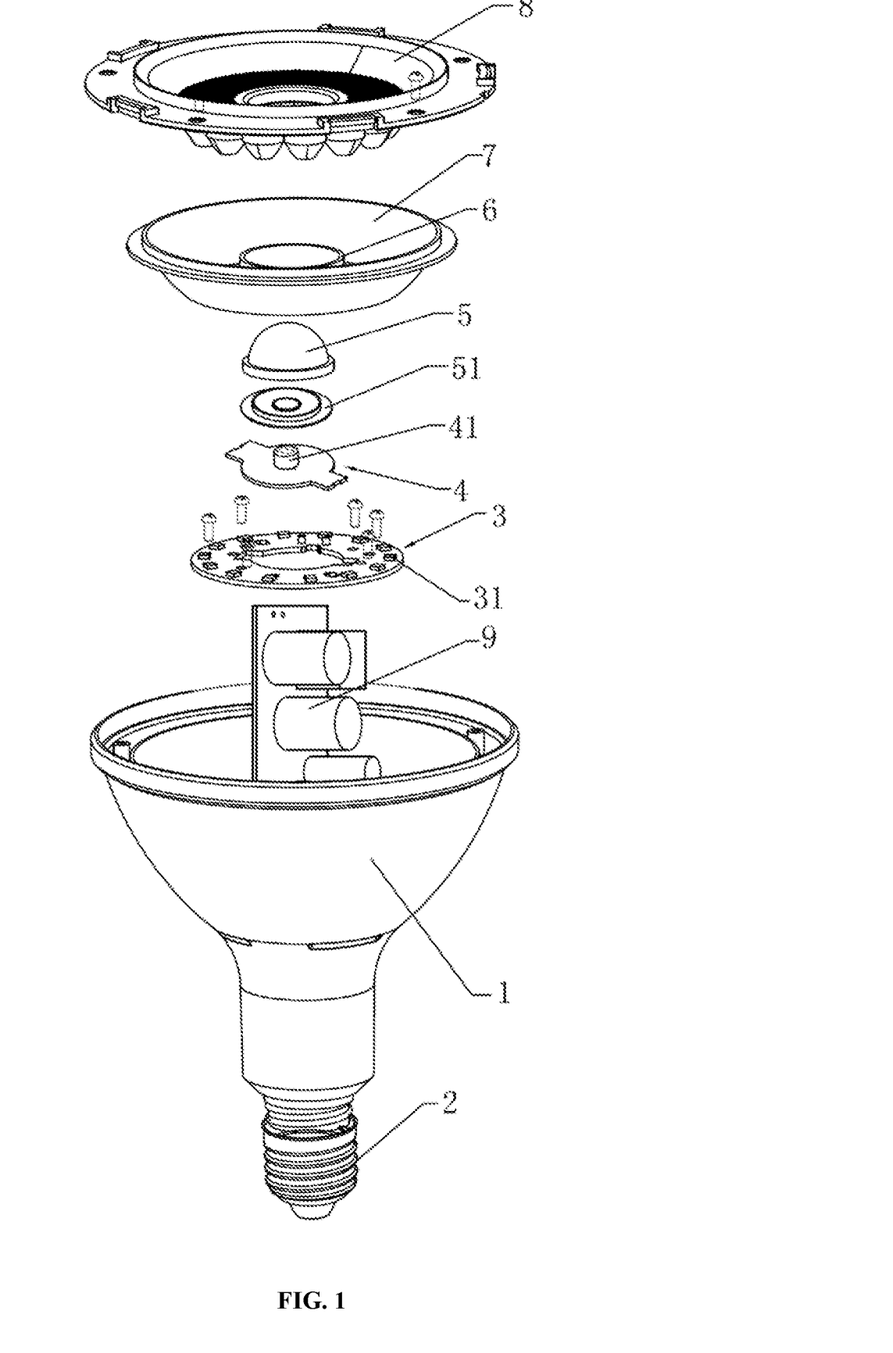
FIG. 1 is an exploded view of an exemplary sensor light consistent with the disclosed embodiments.

In the disclosed embodiments, referring to FIG. 1, directions are defined based on a reversely-placed lamp. A light socket (i.e., lamp holder 2) of the sensor light is considered as at the bottom of the sensor light.

Referring to FIGS. 1-7, an exemplary sensor light is shown. The sensor light may include a housing 1, a power drive circuit 9, an interference reduction structure, a reflector 7, and an optical lens structure 8. Certain components may be omitted and certain components may be added.

A bottom part of the housing 1 may be compatible with and connected to a light socket 2 (e.g., by threaded connection). A top part of the housing 1 may include a top opening having a greater diameter than the bottom part. The diameter of the top part of the housing 1 may gradually decrease downwardly from the top opening to a portion connecting with the bottom part. The power drive circuit 9 and the interference reduction structure may be disposed in an installation space provided by the housing 1 (e.g., a cavity of the housing 1 through the top opening). The power drive circuit 9 may be electrically connected to the interference prevention structure. The reflector 7 and the optical lens structure 8 may be sequentially placed at the top opening of the housing 1. The reflector 7 may have a trumpet shape compatible with the shape of corresponding portion of the housing 1.

The interference reduction structure may include a light emitting module 3 (i.e., light illumination module), a sensor module 4, and a shielding component 6 (i.e., shielding member). The driver circuit 9 is electrically connected to the light emitting module 3 and the sensor module 4. The sensor module 4 may be configured to measure incident infrared light radiated to the sensor module 4, and provide a trigger signal to the power drive circuit 9 when the measured infrared light meets a preset condition. The sensor module 4 may include an infrared sensor (e.g., PIR sensor) disposed on a corresponding substrate. The power drive circuit 9 may be configured to control the light emitting module 3 to emit light (e.g., for providing general lighting to a surrounding indoor/outdoor space) in response to the received trigger signal. The light emitting module 3 may include one or more LED light emitters 31 disposed on a corresponding substrate. The LED light emitters 31 are electrically connected to the power drive circuit 9. The shielding component 6 may be placed between the sensor module 4 and the light emitting module 3, and configured to reduce or prevent infrared lights of the light emitting module 3 from radiating to the sensor module 4, and thereby preventing false triggering. The shielding component 6 may be made of non-polyolefin material.

An inner edge near the top opening of the housing 1 may include a first mounting structure and a second mounting structure. Both mounting structures may have an annular shape or other suitable shapes. The first mounting structure is a layer closer to the top opening of the housing 1 than the second mounting structure. The substrate of the light emitting module 3 may be mounted on and fixed to the second mounting structure (e.g., by screws). The substrate of the light emitting module 3 may be substantially circular. A substrate of the sensor module 4 may be placed on top of a center part of the light emitting module 3 (e.g., by fitting a concentric hole of a ring-shaped substrate of the light emitting module 3). The center of the substrate of the light emitting module 3 and the substrate of the sensor module 4 may have compatible shapes and arrangements. Further, the LED light emitter 31 may be scattered around the center of the light emitting module 3. That is, the LED light emitters 31 may be arranged around the sensor module 4.

Figure 3:
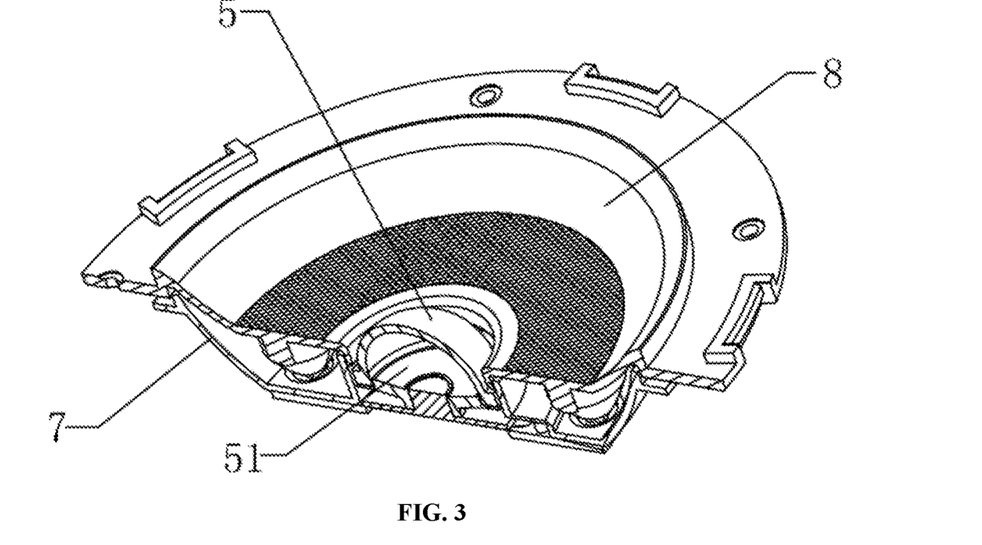
FIG. 3 is a schematic view of a light emitting module, a sensor module, a Fresnel lens, a shielding component, a reflector, and an optical lens structure coordinated with each other consistent with the disclosed embodiments.
Figure 5:
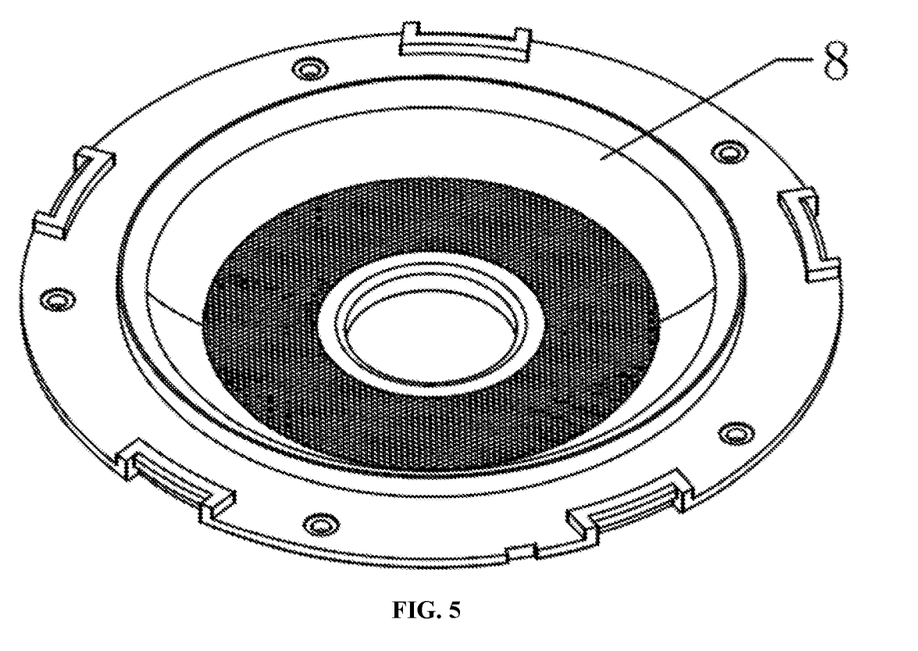
FIG. 5 is a structural diagram of an exemplary optical lens structure consistent with the disclosed embodiments.
Figure 6:
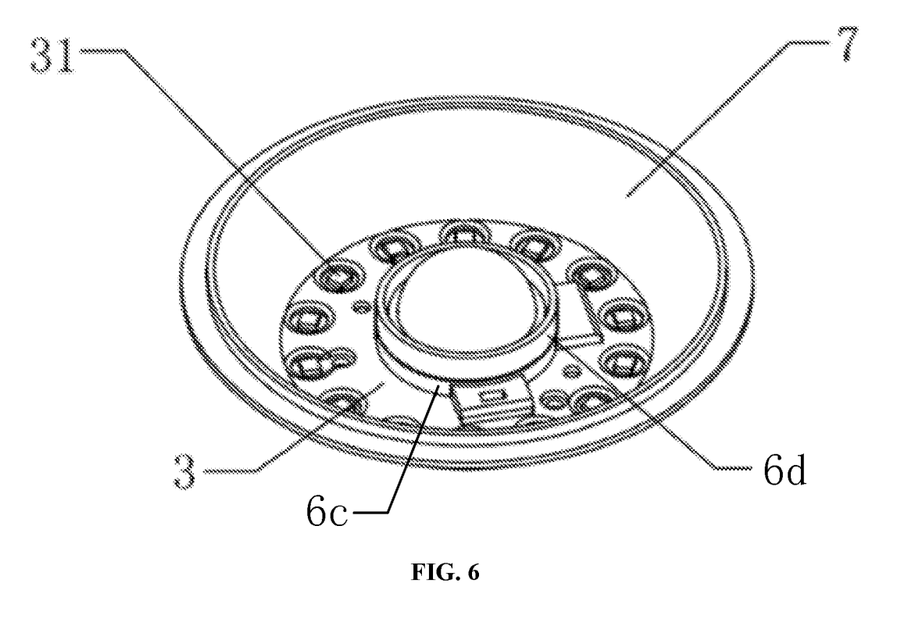
FIG. 6 is a schematic view of a light emitting module, a sensor module, a Fresnel lens, a shielding component, and a reflector coordinated with each other consistent with the disclosed embodiments.

As shown in FIG. 6, the reflector 7 may be mounted on and surround the light emitting module 3. As shown in FIG. 3, the optical lens structure 8 may be mounted on the first mounting structure and press down the reflector 7 firmly, so that the reflector 7 do not shake. That is, the bottom rim of the reflector 7 may contact the substrate of the light emitting module 3 and/or the second mounting structure of the housing 1. The top rim of the reflector 7 may contact the optical lens structure 8 and/or the first mounting structure of the housing 1. The reflector 7 surrounding the light emitting module 3 may be configured to reflect the light emitted by the LED light emitters 31. The optical lens structure 8 may be configured to expand lighting emitting angles, adjust illumination distribution, and enhance light intensity. FIG. 5 is a structural diagram of an exemplary optical lens structure consistent with the disclosed embodiments. The reflector 7 and the optical lens structure 8 may adopt any proper structures or configurations in LED lighting technologies for concentrating the emitted light and enhancing light intensity.

Figure 4:
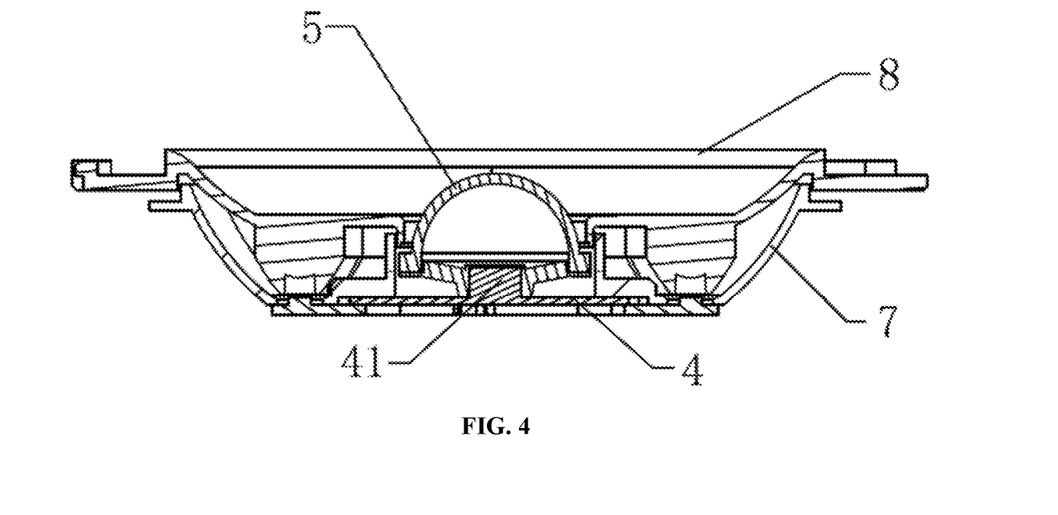
FIG. 4 is a side-view of a light emitting module, a sensor module, a Fresnel lens, a shielding component, a reflector, and an optical lens structure coordinated with each other consistent with the disclosed embodiments.

As shown in FIG. 4 and FIG. 6, after installation, the light emitting module 3 may be located at an opening of a bottom end of the reflector 7. The substrate of the light emitting module 3 may close the opening of the bottom end of the reflector 7.

Figure 2:
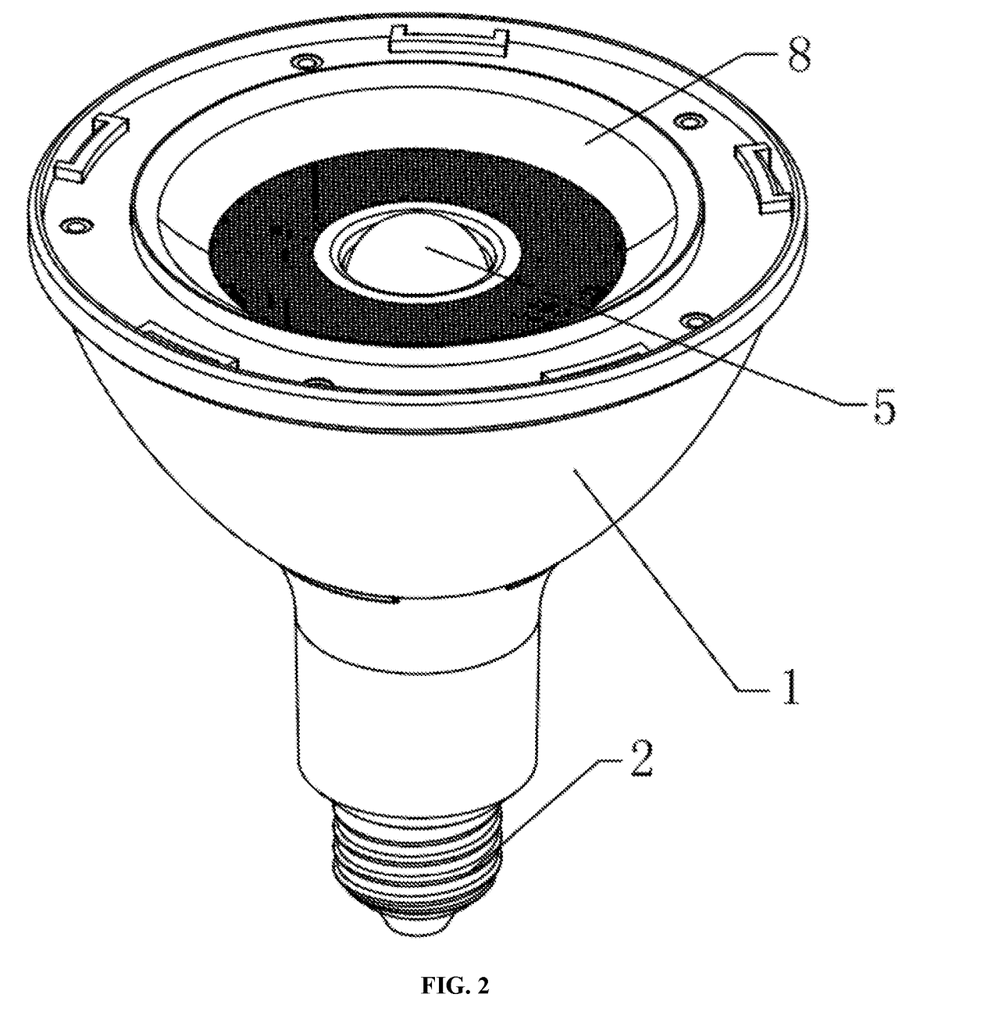
FIG. 2 is a structural diagram of an exemplary sensor light consistent with the disclosed embodiments.

In some embodiments, as shown in FIGS. 1 and 2, the interference reduction structure may further include a Fresnel lens 5. The Fresnel lens 5 may be configured to cover the sensor module 4 and concentrate/focus the incident infrared lights for the sensor module 4. The LED light emitters 31 may be placed outside the Fresnel lens 5. As shown in FIG. 5, a lens holder 51 for fixating the Fresnel lens 5 may be disposed at a center of a top surface of the substrate of the sensor module 4. The Fresnel lens 5 may be mounted and fixed on the lens holder 51 by snap fit or interference fit. Any proper fixation method may be used to install the Fresnel lens 5.

In one embodiment, as shown in FIGS. 3 and 4, an infrared sensor 41 may be configured at the center of the substrate of the sensor module 4. The infrared sensor 41 may have a cylindrical shape. The center of the lens holder 51 may include a circular through-hole having a diameter compatible with a diameter of the infrared sensor 41. The lens holder 51 may be placed on the substrate of the sensor module 4 with the infrared sensor 41 passing through the through-hole of the lens holder 51 accordingly. In other words, the infrared sensor 41 is inserted through the through-hole of the lens holder 51. Accordingly, the lens holder 51 may be firmly fixed on the substrate of the sensor module 4, thereby preventing shakings.

Figure 7:
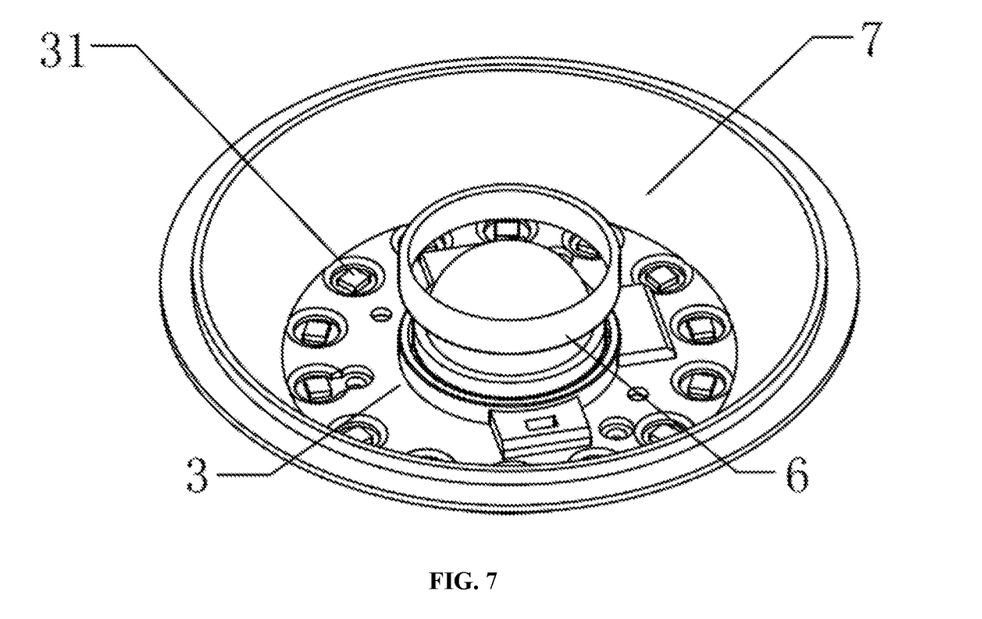
FIG. 7 is another schematic view of a light emitting module, a sensor module, a Fresnel lens, a shielding component, and a reflector coordinated with each other consistent with the disclosed embodiments.
Figure 8:
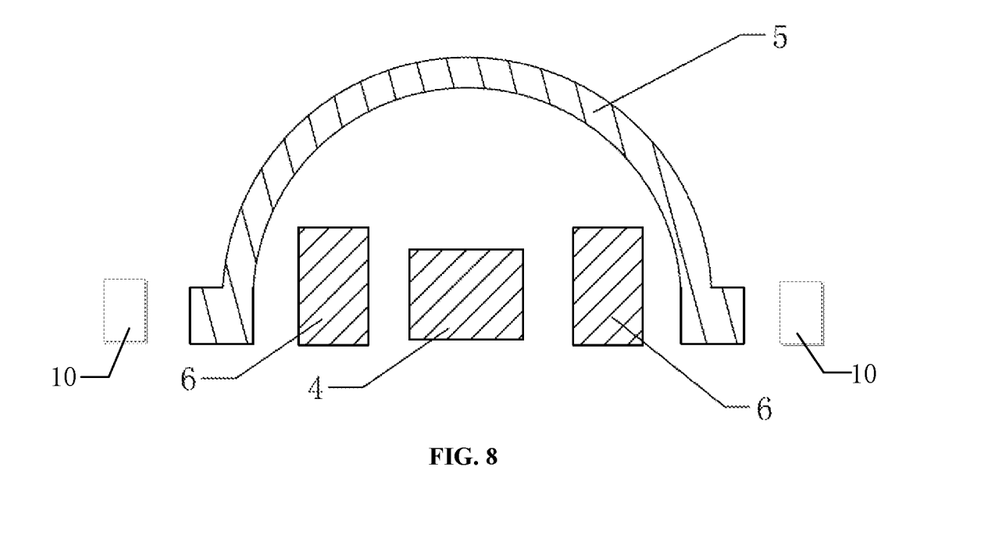
FIG. 8 is a schematic view of an exemplary way for placing a shielding component consistent with the disclosed embodiments.
Figure 9:
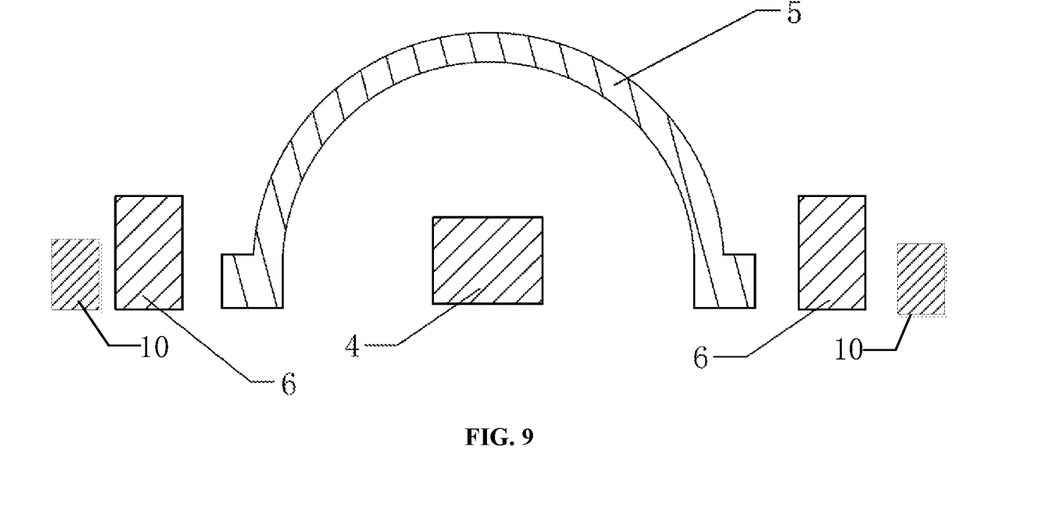
FIG. 9 is a schematic view of another exemplary way for placing a shielding component consistent with the disclosed embodiments.
Figure 10:
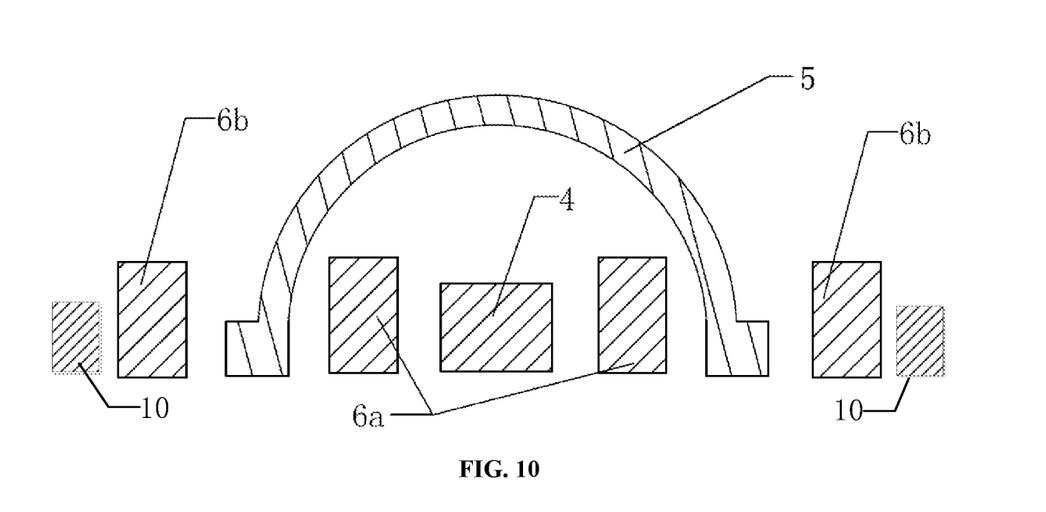
FIG. 10 is a schematic view of yet another exemplary way for placing a shielding component consistent with the disclosed embodiments.
Figure 11:
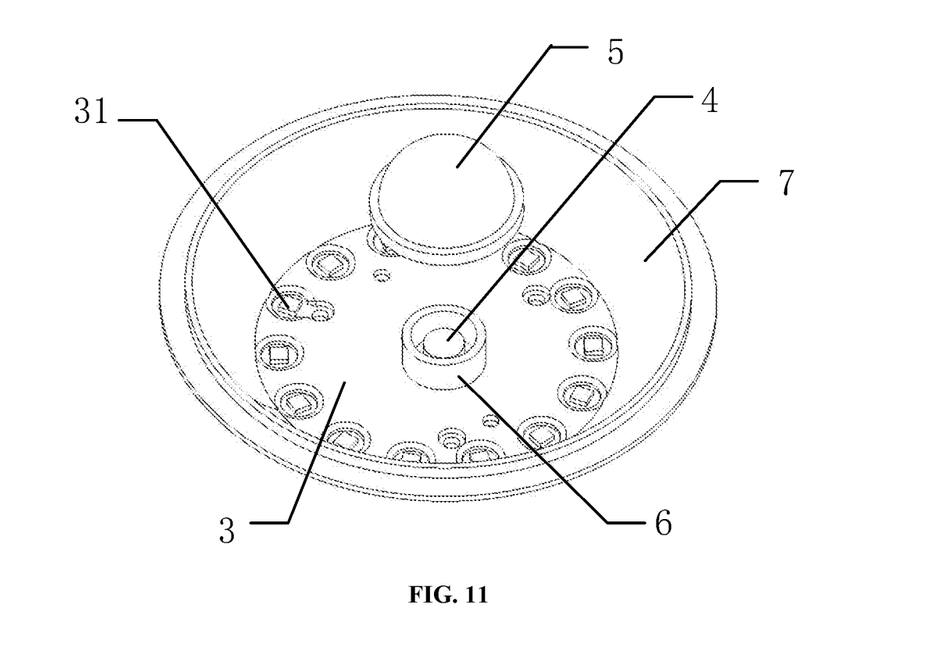
FIG. 11 is a schematic view of an exemplary shielding component placed inside the Fresnel lens consistent with the disclosed embodiments.

The shielding component 6 may be configured in any proper ways. In one example, the shielding component 6 may be placed inside the Fresnel lens 5 and covered by the Fresnel lens 5 (e.g., as shown in FIGS. 8 and 11). In another example, the shielding component 6 may be placed outside the Fresnel lens 5, and surrounds the Fresnel lens 5 (e.g., as shown in FIGS. 6, 7, and 9). The shielding component 6 may tightly wrap the Fresnel lens 5, or may be placed at a preset interval with the Fresnel lens 5. The sensitivity for measuring infrared variations of the outer environment of the sensor module 4 may not be effected by the shielding component 6. In yet another example, the shielding component 6 may include a first shielding member 6a and a second shielding member 6b (e.g., as shown in FIG. 10). The first shielding member 6a may be covered by the Fresnel lens 5, and the second shielding member 6b may surround an outside of the Fresnel lens 5. In some embodiments, the shielding component 6 may be mounted inside the reflector 7, as shown in FIG. 1.

In an exemplary embodiment, the highest horizontal level of the shielding component 6 is no greater than a highest horizontal level of the Fresnel lens 5. As used herein, a horizontal level refers to a surface level perpendicular to an axis of the sensor light. A higher horizontal level refers to a surface lever farther away from the lamp holder 2. Further, the highest horizontal level of the shielding component 6 may be higher or lower than the top end of the infrared sensor 41.

In an exemplary embodiment, a bottom end of the shielding component 6 may be at a same or lower horizontal level of the LED light emitters 31, and a top end of the shielding component 6 may be at a same or higher level of the light emitting module 3. A thickness of the shielding component and a location of the shielding component (e.g., a distance to the light emitting module 3, a distance to the sensor module 4 or Fresnel lens 5) may be determined based on a lighting intensity of the light emitting module 3. Further, the highest horizontal level of the shielding component 6 (e.g., a height of the shielding component 6 when the bottom end of the shielding component 6 is located at a same horizontal level) may be determined based on light intensity of the light emitting module 3, the location of the shielding component (e.g., a distance from the light emitting module 3, or a distance from the sensor module 4), the highest horizontal level of the light emitting module 3, and/or the highest horizontal level of the sensor module 4 or the Fresnel lens 5. For example, as the light intensity of the light emitting module 3 increases, the top end of the shielding component 6 may be configured at a higher horizontal level. As the distance between the shielding component 6 and the light emitting module 3 decreases, the top end of the shielding component 6 may be configured at a lower horizontal level. As the highest horizontal level of the light emitting module 3 increases, the top end of the shielding component 6 may be configured at a higher horizontal level.

Figure 12:
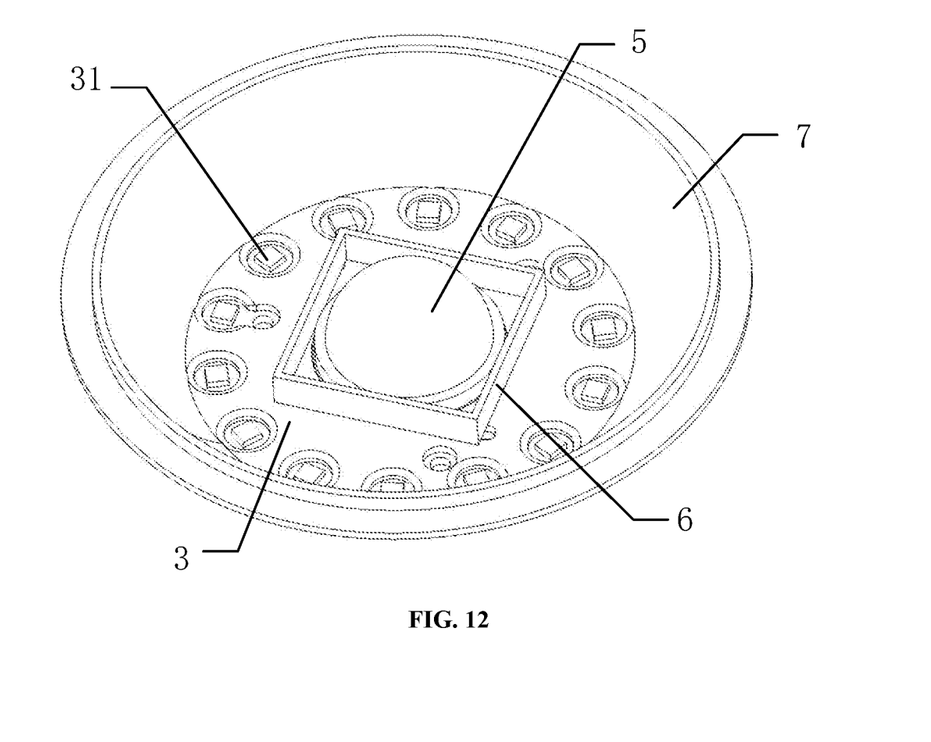
FIG. 12 is a schematic view of an exemplary shielding component placed outside the Fresnel lens consistent with the disclosed embodiments.

In some embodiments, the top end of the shielding component 6 is open. A shape of a cross section of the shielding component 6 may be circle, eclipse, ring, or rectangle (e.g., as shown in FIG. 12). In some embodiments, the shielding component 6a may have a different shape than the shielding component 6b.

In some embodiments, the shielding component 6 may have a single layer structure or may include multiple layers. For example, as shown in FIG. 6, the shielding component 6 may include a first ring layer 6c contacting the substrate of the light emitting module 3, and a second ring layer 6d placed on top of the first ring layer 6c for providing shield with greater height.

In some embodiments, the shielding component 6 may generally have a wall shape. The shielding component 6 may include one or more layers of wall (e.g., at different distances from the center point of the sensor module 4). The wall may have uniform thickness or uneven thickness (e.g., gradually thicker from top to bottom). The wall may be a continuous ring-shaped wall concentric with the sensor module 4. Alternatively, the wall may be formed by discrete pieces of wall components. The wall components may be connected by contacting each other or may be placed at certain intervals. The wall components may have uniform heights or different heights.

In one embodiment, one side of the wall of the shielding component 6 may be vertical. The highest horizontal level of the shielding component 6 may be determined based on light intensity of the light emitting module 3, a distance between the shielding component 6 and the light emitting module 3, and the highest horizontal level of the light emitting module 3.

In another embodiment, one side of the wall of the shielding component 6 may be slanted (e.g., the side facing the light emitting module 3 and outer shell of the housing 1). A top end of the wall may lean forward to the LED light emitters 31. In other words, a horizontal distance between the top end of the wall and the LED light emitter 31 is smaller than that between the bottom end of the wall and the LED light emitter 31.

Further, when the inclination of the wall (i.e., a slanted degree, or an angle between the horizontal plane and the slanted side of the wall) is set, the height of the wall may be determined based on the light intensity of the light emitting module 3, the distance between the shielding component 6 and the light emitting module 3, and the highest horizontal level of the light emitting module 3. When the height of the wall is set and the wall has a uniform thickness, the inclination of the wall may be determined based on the light intensity of the light emitting module 3, the distance between the shielding component 6 and the sensor module 4, and the highest horizontal level of the sensor module 4. For example, as the light intensity of the light emitting module 3 increases, or as highest horizontal level of the sensor module 4 increases, the inclination of the shielding component 6 may be configured to have a greater value.

In yet another embodiment, one side of the wall of the shielding component 6 may be slanted, and the top end of the wall may lean backward against the LED light emitters 31. In other words, a horizontal distance between the top end of the wall and the LED light emitter 31 is greater than that between the bottom end of the wall and the LED light emitter 31. When the height of the wall is set and the wall has a uniform thickness, the inclination of the wall may be determined based on the light intensity of the light emitting module 3, the distance between the shielding component 6 and the sensor module 4, and the highest horizontal level of the sensor module 4. For example, as the light intensity of the light emitting module 3 increases, or as highest horizontal level of the sensor module 4 increases, the inclination of the shielding component 6 may be configured to have a smaller value.

In some embodiments, the light emitting module 3 (e.g., LED light emitter 31) and the sensor module 4 may be disposed at different sides of the shielding component 6. Specifically, the bottom end of the shielding component 6 may be at a same or lower horizontal level than that of the sensor module 4; and the top end of the shielding component 6 may be at a same or higher horizontal level than that of the light emitting module 3.

The present disclosure further provides a system for preventing false triggering of a sensor module. Referring to FIGS. 8-10, an exemplary system may include a sensor module 4, and a shielding component 6. The system may prevent infrared lights generated by a heat dissipation source 10 from interfering with the sensor module 4. The sensor module 4 may be configured to measure incident infrared light radiated to the sensor module 4, and generate a trigger signal when the measured infrared light meets a preset condition (e.g., measured infrared light reaches a preset threshold). The shielding component 6 may be disposed between the sensor module and the heat dissipation source 10, and configured to shield the sensor module 4 from radiation of infrared light generated by the heat dissipation source 10.

In some embodiments, the shielding component 6 may originate at a same or lower horizontal level than the sensor module 4, and may surround a side (e.g., an outside) of the sensor module 4. Further, the highest horizontal level of the shielding component may be greater than a highest horizontal level of the heat dissipation source 10.

In some embodiments, the system may further include a Fresnel lens 5, configured to cover the sensor module 4 and concentrate the incident infrared light for the sensor module 4. The highest horizontal level of the shielding component 6 is no greater than a highest horizontal level of the Fresnel lens 5.

The shielding component 6 may be configured in any proper ways. In one example, the shielding component 6 may be placed inside the Fresnel lens 5 and covered by the Fresnel lens 5 (e.g., as shown in FIG. 8). In another example, the shielding component 6 may be placed outside the Fresnel lens 5, and surrounds the Fresnel lens 5 (e.g., as shown in FIGS. 6, 7, and 9). The shielding component 6 may tightly wrap the Fresnel lens 5, or may be placed at a preset interval with the Fresnel lens 5. The sensitivity for measuring infrared variations of the outer environment of the sensor module 4 may not be effected by the shielding component 6. In yet another example, the shielding component 6 may include a first shielding member 6a and a second shielding member 6b (e.g., as shown in FIG. 10). The first shielding member 6a may be covered by the Fresnel lens 5, and the second shielding member 6b may surround an outside of the Fresnel lens 5.

It can be understood that, the disclosed system for preventing false triggering of a sensor module may be implemented on motion sensing appliances other than the sensor light, such as a motion sensing speaker, a motion sensing air conditioner, etc. The disclosed system may prevent false triggering of the sensor module caused by the heat dissipation source (e.g., a speaker, a power source, a radiator) in the same appliance.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A sensor light, comprising:
a sensor module configured to measure incoming infrared light radiated to the sensor module, and generate a trigger signal when the measured infrared light meets a preset condition;
a light emitting module configured to emit light;
a power drive circuit connected to the sensor module and the light emitting module, and configured to receive the trigger signal from the sensor module, and control the light emitting module to emit light in response to the trigger signal received from the sensor module;
a Fresnel lens configured to cover the sensor module and concentrate the incoming infrared light for the sensor module, wherein the light emitting module is located outside the Fresnel lens; and
a shielding component disposed between the sensor module and the light emitting module, and configured to shield the sensor module from radiation of infrared light generated by the light emitting module;
wherein:
the shielding component originates at a same or lower horizontal level than the sensor module, and surrounds a side of the sensor module, a horizontal level referring to a level of a plane perpendicular to an axis direction of the sensor light;
a highest horizontal level of the shielding component is greater than a highest horizontal level of the light emitting module; and
the shielding component includes a first layer covered by the Fresnel lens and a second layer that surrounds a side of the Fresnel lens.

2. The sensor light according to claim 1, wherein:
the highest horizontal level of the shielding component is greater than a highest horizontal level of the sensor module.

3. The sensor light according to claim 2, wherein:
a height of the shielding component is determined based on a lighting intensity of the light emitting module, the highest horizontal level of the light emitting module, a location of the sensor module, and the highest horizontal level of the sensor module.

4. The sensor light according to claim 1, wherein:
the highest horizontal level of the shielding component is no greater than a highest horizontal level of the Fresnel lens.

5. The sensor light according to claim 1, wherein:
the shielding component includes a vertical wall or a slanted wall.

6. The sensor light according to claim 5, wherein:
a slanted degree of the shielding component corresponds to a lighting intensity of the light emitting module, a location of the sensor module, and the highest horizontal level of the sensor module.

7. The sensor light according to claim 1, wherein:
a top end of the shielding component is open; and a cross section of the shielding component has a circular shape, an eclipse shape, or a rectangular shape.

8. The sensor light according to claim 1, wherein:
the sensor module is disposed on a center of a substrate of the light emitting module;
the light emitting module includes a plurality of LED light emitters scattered around the center of the substrate of the light emitting module; and
a lens holder is disposed on a substrate of the sensor module for mounting the Fresnel lens.

9. The sensor light according to claim 1, wherein:
a material of the shielding component is non-polyolefin.

10. The sensor light according to claim 1, wherein:
a thickness of the shielding component and a distance between the shielding component and the light emitting module is determined based on a lighting intensity of the light emitting module.

11. The sensor light according to claim 1, further comprising: a housing including an opening top part and a bottom part, a lamp holder for connecting to the bottom part of the housing, a reflector, and an optical lens structure; wherein:
the sensor module, the light emitting module, and the power drive circuit are installed in the housing through the opening top part;
the reflector and the optical lens structure are sequentially disposed at the opening top part; and
the optical lens structure has a compatible shape for covering the opening top part of the housing.

12. The sensor light according to claim 11, wherein:
an inner edge of the top opening part includes a first mounting structure and a second mounting structure, the first mounting structure being closer to a top end of the housing than the second mounting structure;
the optical lens structure is mounted on the first mounting structure by a first fastening piece; and
the light emitting module is mounted on the second mounting structure by a second fastening piece.

13. A system for preventing false triggering of a sensor module, comprising:
a sensor module configured to measure incoming infrared light radiated to the sensor module, and generate a trigger signal when the measured infrared light satisfies a preset condition;
a shielding component located between the sensor module and a heat dissipation source, and configured to shield the sensor module from radiation of infrared light generated by the heat dissipation source; and
a Fresnel lens configured to cover the sensor module and concentrate the incoming infrared light for the sensor module, wherein the heat dissipation source is located outside the Fresnel lens;
wherein:
the shielding component originates at a same or lower horizontal level than the sensor module, and surrounds a side of the sensor module;
the highest horizontal level of the shielding component is greater than a highest horizontal level of the heat dissipation source; and the shielding component includes a first layer covered by the Fresnel lens and a second layer that surrounds a side of the Fresnel lens.

* * * * *